(12) United States Patent
Childers et al.

(10) Patent No.: US 6,860,606 B2
(45) Date of Patent: Mar. 1, 2005

(54) PROJECTOR HAVING CONCENTRATED BEAM

(75) Inventors: Winthrop D. Childers, San Diego, CA (US); Michael A. Pate, Tuscon, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 10/608,941

(22) Filed: Jun. 26, 2003

(65) Prior Publication Data

US 2004/0141158 A1 Jul. 22, 2004

Related U.S. Application Data

(63) Continuation-in-part of application No. 10/349,047, filed on Jan. 21, 2003.

(51) Int. Cl.[7] .............................................. G03B 21/14
(52) U.S. Cl. ........................... 353/31; 353/37; 353/85; 353/94
(58) Field of Search ............................... 353/30, 31, 37, 353/85, 94; 348/742, 744

(56) References Cited

U.S. PATENT DOCUMENTS

| | | | |
|---|---|---|---|
| 4,800,375 A | 1/1989 | Silverstein et al. | |
| 5,422,693 A | 6/1995 | Vogeley et al. | |
| 5,715,021 A | 2/1998 | Gibeau et al. | |
| 5,806,950 A | 9/1998 | Gale et al. | |
| 6,128,132 A | 10/2000 | Wieland et al. | |
| 6,224,216 B1 | 5/2001 | Parker et al. | |
| 6,283,597 B1 | 9/2001 | Jorke | |
| 6,325,514 B1 * | 12/2001 | Yamamoto | 353/31 |
| 6,334,685 B1 * | 1/2002 | Slobodin | 353/31 |
| 6,364,487 B1 | 4/2002 | Weber et al. | |
| 6,460,999 B1 | 10/2002 | Suzuki | |
| 6,481,852 B2 | 11/2002 | Osaka | |
| 6,547,400 B1 * | 4/2003 | Yokoyama | 353/98 |
| 6,799,849 B2 * | 10/2004 | Kim et al. | 353/30 |

* cited by examiner

*Primary Examiner*—W. B. Perkey

(57) ABSTRACT

A concentrated beam source for a projector includes a plurality of individually addressable light sources configured in a two-dimensional array and a beam concentrator. The beam concentrator is configured to receive light from the plurality of light sources and to produce a reduced beam of collimated light having a component representative of each light source. The reduced beam has cross-sectional dimensions smaller than cross-sectional dimensions of the two-dimensional array.

62 Claims, 3 Drawing Sheets

PROJECTOR HAVING CONCENTRATED BEAM

RELATED PATENT APPLICATIONS

This is a continuation-in-part application of U.S. patent application Ser. No. 10/349,047, entitled "Projector Having Alignment Optics and Electronics", by Winthrop Childers, filed on Jan. 21, 2003.

BACKGROUND

Projectors utilize light sources, optical systems and controllers to display images on a viewing surface, such as a wall or screen, for viewing by a group of people. They are especially popular among business users who give presentations as part of their job responsibilities. In one type of projector, images of controlled light sources may be scanned across a viewing surface. The light sources typically are of different colors and are modulated to produce a scanned image. An array of light sources may be used to reduce the number of scans that are made, to increase the luminous flux, or to provide redundancy in scanning to compensate for malfunctioning light sources. The light sources making up the arrays may not be available in small, clustered groups. This then may require that the optical system be large enough to accommodate the transmission and manipulation of the light along the optical path.

SUMMARY

A concentrated beam source for a projector includes a plurality of individually addressable light sources configured in a two-dimensional array and a beam concentrator. The beam concentrator is configured to receive light from the plurality of light sources and to produce a reduced size beam of collimated light having a component representative of each light source. The reduced size beam has cross-sectional dimensions smaller than cross-sectional dimensions of the two-dimensional array.

DETAILED DESCRIPTION

Figure 1:
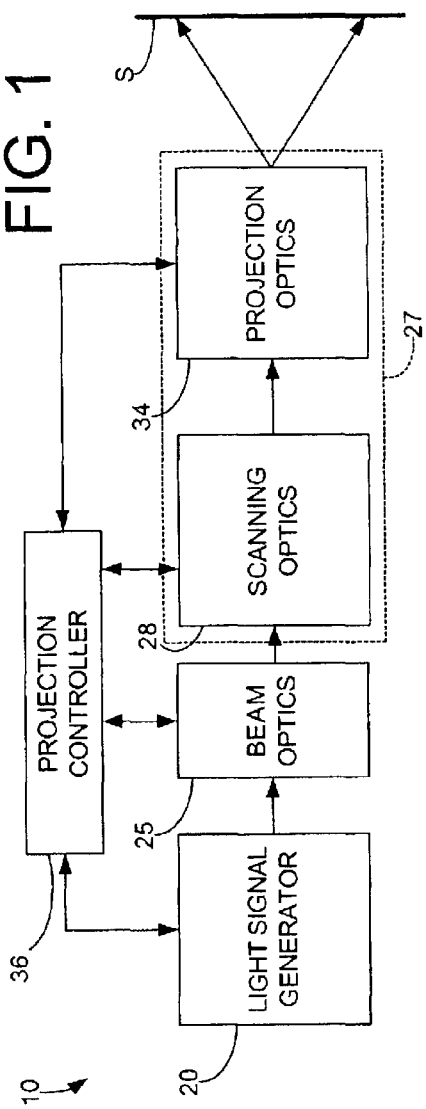
FIG. 1 is a block diagram of a projector that may be constructed according to an embodiment of the invention.
Figure 2:
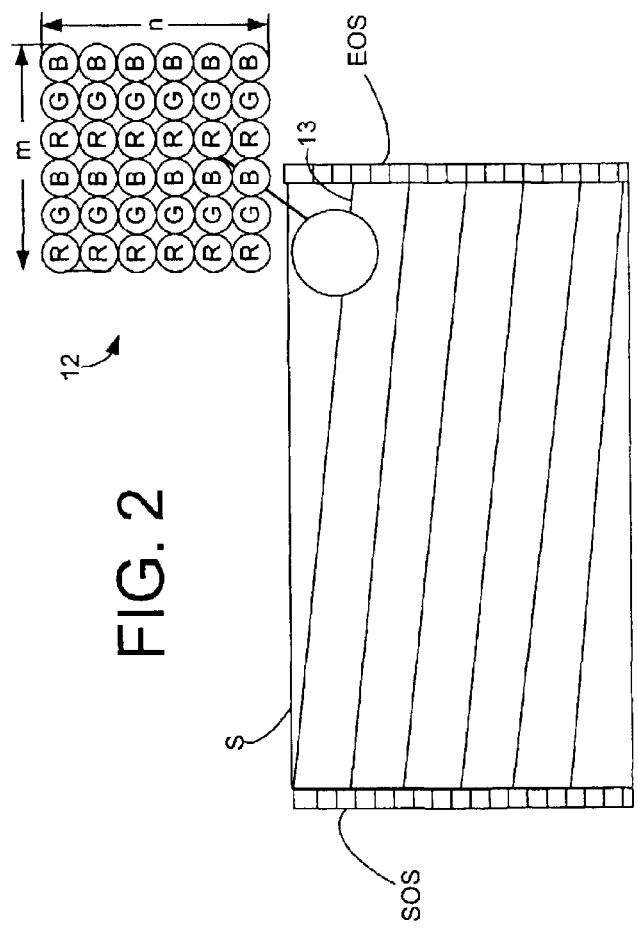
FIG. 2 is a simplified diagrammatic representation of the scan of a viewing surface of a super pixel generated by the projector of FIG. 1.

Referring now to the drawings and more particularly to FIGS. 1 and 2, there is illustrated a projector 10 that may be constructed according to an embodiment of the invention. Projector 10 generally includes a light engine or light signal generator 20, concentrated beam optics 25 and display optics 27 that may be controlled by a projection controller 36. Light signal generator 20 may include an array of individually addressable colored light sources. Each light source may include one or more light-emitting elements, such as light-emitting semiconductor devices or laser devices. Representative devices may further include light-emitting diodes (LEDs), laser diodes, high luminance emitting devices, and vertical cavity surface emitting lasers (VCSELs) in available colors. Beam optics 25 may receive light from the light sources and produce a collimated light beam having a cross section that is smaller than the cross section of the array of light sources and has a component of light from each light source. Display optics 27 may include scanning optics 28 and projection optics 34. Projection optics 34 may project light onto a viewing surface, such as screen S. The light may move across the viewing surface in a pattern determined by operation of scanning optics 28. Projector 10 thus may be understood to include a spatial light modulator having a light signal generator 20, concentrated beam optics 25 and display optics 27, which collectively modulate light to spatially define an image.

As shown in FIG. 2, the projector 10 may generate a super pixel, indicated generally at 12, on screen S. In the example shown, super pixel 12 includes an m by n array of light spots, identified as R, G, and B corresponding to the respective colors red, green and blue, formed by a corresponding array of red, green and blue light sources, respectively, included in light signal generator 20. Super pixel 12 may accordingly represent the shape and configuration of an array of light sources included in light signal generator 20, as well as the shape and configuration of a reduced light beam produced by beam optics 25. An individually addressable light source may be associated with each individual light spot. The viewing area on screen S may be defined by an M by N matrix array of individual pixel locations. The projector 10 may cause the super pixel 12 to be repetitively swept across the viewing surface area S in an interleaved and staggered scan pattern so that at least one light spot of each color scans each pixel location. Successive scans of the super pixel or light from different light sources in an array of light sources may overlap to reduce the effect of burned out, misdirected, or marginally operating light-emitting sources that would otherwise result in a degraded projected image.

Figure 3:
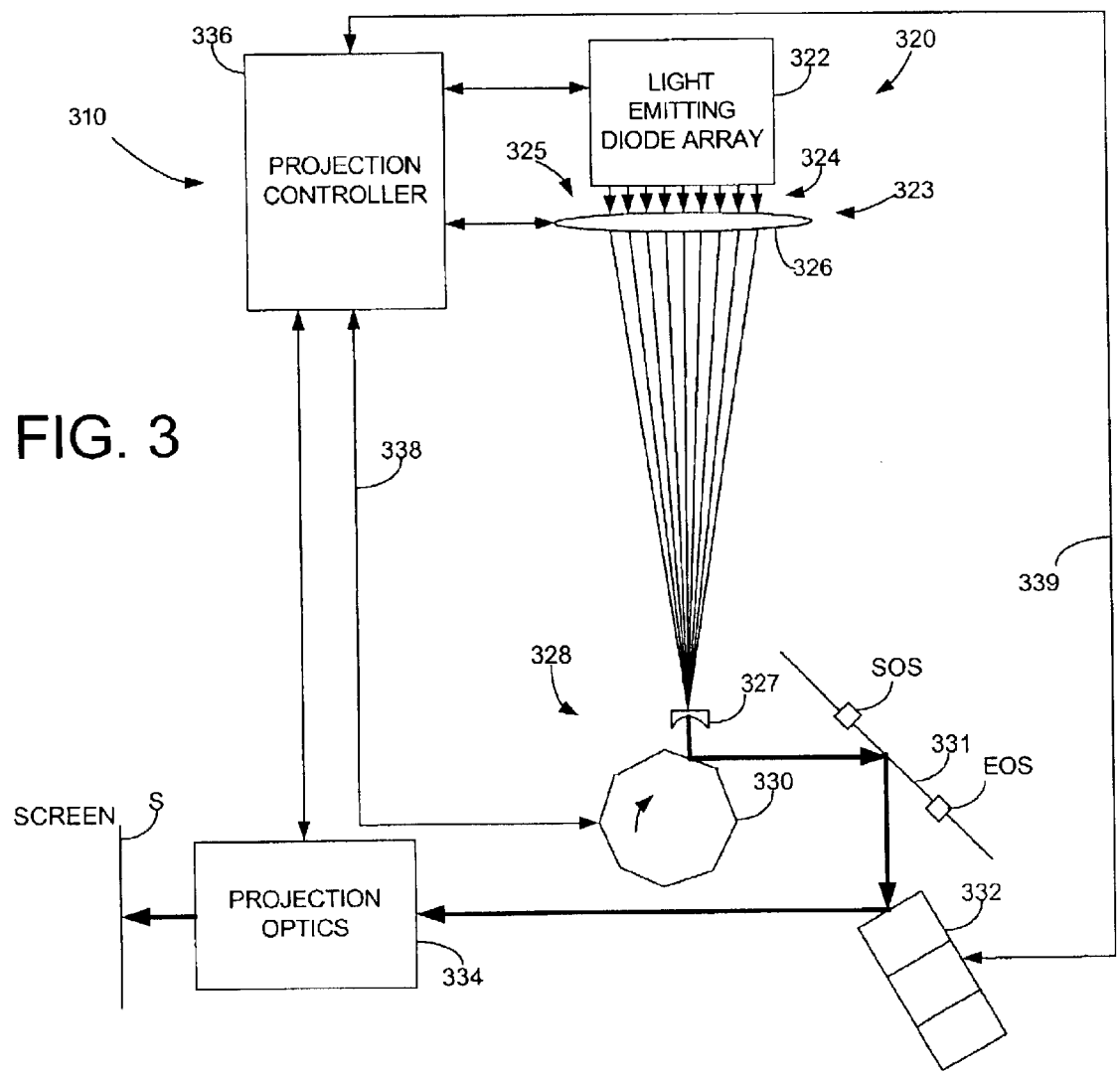
FIG. 3 is a schematic representation of a projector according to an embodiment of the invention.

FIG. 3 illustrates a projector 310 according to another embodiment. Projector 310 may include a light signal generator 320 having a plurality of light-emitting sources, such as those of light-emitting diode array 322, producing a plurality of light beams 324. Optionally, light beams 324 may produce a source beam 323 of collimated light formed of individual light beams 324. LEDs may have individual lenses, not shown, that collectively collimate the light from the array. The light-emitting diode array 322, in response to image control signals from the projection controller 336, may produce the plurality of collimated light beams 324 that form, when scanned across the viewing area of a screen S, either a still image or a moving image.

The light-emitting diode array 322 may include a plurality of light-emitting diodes arranged in a matrix array of m by n light-emitting diodes, such as a 6 by 6 matrix array, that produce the plurality of collimated light beams indicated generally at 324 having the same configuration as the R, G, and B pixel locations identified in super pixel 12 in FIG. 2. Such an array may be constructed from full color light-emitting diodes manufactured and sold by Teledyne Electronic Technologies of Los Angeles, Calif. identified as UB101M-1R, 1G, 1B with different degrees of luminance ranging between about 520,000 fL to about 110,000 fL. Other diodes are available from companies such as LUMILED of San Jose, Calif.

Although the super pixel 12, representing the configuration of the array of light sources, is illustratively depicted as being an m by n array of spots, other patterns may be used. For instance, the light-emitting sources may be arranged as a 3 by 3 array of differently colored sub-arrays, with each sub-array formed as a 3 by 3 array of like-colored light-emitting sources. The array may also take other regular or irregular shapes. For instance, the configuration may be generally circular, with a hexagonal close-packed arrangement of spots. In another example, the super pixel may have overlapping, overlaying, or irregularly spaced or arranged spots. Additionally, the light source array need not have the same geometric configuration that the superpixel has since optics between the light source array and the superpixel may be used to reconfigure light components from the light sources. Such optics may include components such as waveguides, integrating rods, integrating tubes, illumination optics, optical fibers, dichroic mirrors, prisms, or condensing lenses.

The projection controller 336, in response to an image source (not shown) such as a high definition television signal, a computer signal, a video device signal, or the like, turns the individual light-emitting diodes in array 322 on and off to produce a desired full color image. The light sources also may be modulated by pulse width modulation, amplitude (intensity) modulation, or a combination of these techniques. In this regard, light-emitting diode array 322 is made up of red-light-emitting diodes, green-light-emitting diodes, and blue-light-emitting diodes. By varying the on-off cycle of each individual light-emitting diode, an intensity gradient of several different intensity levels may be established. In this regard, the projected image that is displayed on the screen S may be a still image or a moving image, either in full color or in black and white.

Light beams 324, produced by the light-emitting diode array 322, may be concentrated by the beam forming optics 325 to produce a reduced size light beam. The source light beam 323 may be reduced, collimated and directed to scanning optics 328 by the beam forming optics 325. The beam forming optics may include the combination of a converging lens 326 that reduces the size of the light beam, and a collimating lens 327 that collimates the beam at a size that is reduced from the size of the array of light sources. Collimating lens 327 may be a diverging lens that directs an image of the light sources in a direct line. It will be appreciated that these optical elements may be refractive, reflective, or diffractive in nature. Scanning optics 328, including a horizontal scanner 330 and a vertical scanner 332, under control of the projector controller 336, may manipulate the reduced beam so that when projected by projection optics 334, the super pixel is imaged on the screen S. During scanning, each light source image is aligned with successive pixel locations on the viewing area of the screen. The size of the super pixel footprint on the viewing surface may be controlled through magnification by projection optics 334.

Figure 4:
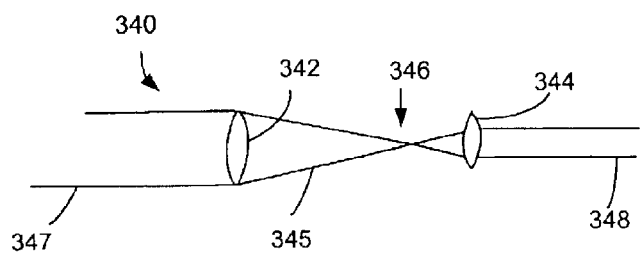
FIG. 4 is a diagram of a Keplerian beam expander useable in a display device according to an embodiment of the invention.
Figure 5:
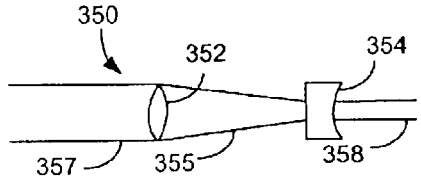
FIG. 5 is a diagram of a Galilean beam expander useable in a display device according to an embodiment of the invention.

Examples of beam-forming optics configured as afocal beam expanders 340 and 350 are illustrated in FIGS. 4 and 5, respectively. Afocal beam expanders 340 and 350 may have a negative magnification to make the array of beams smaller at the exit of the beam expander. Those skilled in the art will recognize that beam expanders may be made from various combinations of reflective, refractive, and diffractive optical elements. For convenience, the term lens refers to optical devices of these different types. Beam expander 340, shown in FIG. 4, is referred to as a Keplerian beam expander. The Keplerian beam expander is made from two groups of positive power elements, such as a first positive lens 342 and a second positive lens 344. A light beam 345 has a crossover 346 between groups. Accordingly, an entrance beam 347 has a larger cross section than an exit beam 348.

Beam expander 350, shown in FIG. 5, is referred to as a Galilean beam expander. The Galilean beam expander has a first positive lens or group of lenses, such as lens 352, that has a positive power, and a second lens or group of lenses, such as lens 354, that has a negative power. A light beam 355 between the two lens groups has no light crossover. Again, an entrance beam 357 has a larger cross section than an exit beam 358.

As an example of the reduction in beam size that may be provided by beam forming optics 325, LEDs may be available commercially in packages that are about one centimeter across. A 6×6 light-emitting diode array, as represented by the configuration of super pixel 12, may thus be about 6 centimeters by 6 centimeters in size. The subsequent optical system to support this size of array would have large dimensions in order to accommodate this array if it were to be directly transmitted to the scanning optics 328. In order to realize a substantial reduction in the size and expense of the scanning optics, the size of the reduced beam may be less than one-fourth of the dimension of light-emitting diode array 322, typically on the order of one centimeter wide or less. More typically, a reduction to less than one-tenth the size of the light source array, which is an order of magnitude less, may be realized. A reduced beam width of about 0.5 centimeter thus may be achieved.

Describing scanning optics 328 more specifically, a horizontal scanner 330 may be an x-axis polygon or multifaceted mirror that is mounted for controlled rotational movement under the control of the projection controller 336. A vertical scanner 332 may be a y-axis polygon or multifaceted mirror that is also mounted for controlled rotational movement under the control of the projector controller 336.

Other designs are possible for the scanning optics 328. As one example, a combination of a polygon mirror and a galvanometer mirror may be used to produce vertical and horizontal scanning. As another example, two galvanometer mirrors may be utilized for horizontal and vertical scanning.

The x-axis polygon mirror 330 may be mounted orthogonal to the y-axis polygon mirror 332. A folding mirror 331 may be interposed between the x-axis polygon mirror 330 and the y-axis polygon mirror 332 in order to transfer the super pixel from the x-axis polygon mirror 330 to the y-axis polygon mirror 332. By having two spinning mirrors on transverse axes, the collimated light beam may sweep out a portion of a rectangle such as represented simplistically in FIG. 2. In this regard, if a single beam in the super pixel 12 is activated and all the remaining beams in the super pixel 12 are deactivated, a single line trace indicated in the form of a dashed line 13 (FIG. 2) traces out a slanted line across the rectangle as it scans. The scanning mirrors could also be aligned to provide horizontal or vertical scanning across the viewing area of screen S.

If redundancy of scanning is desired, a plurality of light beam components associated with a corresponding plurality of light sources may overwrite the same regions of viewing screen S. Thus, if a single light-emitting diode within the diode array 322 burns out, this may only cause an overall reduction in the intensity of that color as viewed on the screen. The relative angular speeds of the polygon mirrors 330 and 332 may be adjusted to provide for a desired scanning pattern.

In order to control the rotational speed of the horizontal scanner 330 and the vertical scanner 332, each of the scanners 330 and 332 may include encoder devices that generate rotational speed signals that are coupled to the projector controller 336 via two-way control lines which include a horizontal scan control line 338 and a vertical scan control line 339. The projector controller 336 may read the encoder signals generated by the polygon mirrors 330 and 332 to determine their rotational speed. Feedback signals may be provided that cause the rotational speeds to be maintained, increased or decreased to achieve a desired scanning pattern. Interleaving may also be determined by the relative number of facets on the mirrors. Use of a different numbers of facets may affect the optimal relative speeds of the two mirrors. Alternately, a start of scan SOS and or an end of scan EOS detector may be placed inside the optical system to detect when the scanned array reaches the start or end of a scan line. In a rear projection application, this SOS detector may be placed at the rear screen location.

FIG. 2 illustrates one of many possible sets of scan paths across viewing screen S. The horizontal scanner 30 may displace the super pixel 12 on the horizontal axis at an x-axis displacement rate that is substantially greater than the rate that vertical scanner 32 is displacing the super pixel 12 on the vertical axis. That is, the x-axis displacement rate may be substantially greater than the y-axis displacement rate. The reverse may also be true, or the scanning rates may be of the same order of magnitude. Typically, the viewing area is completely scanned at a rate that avoids the perception of flickering of the image.

Figure 6:
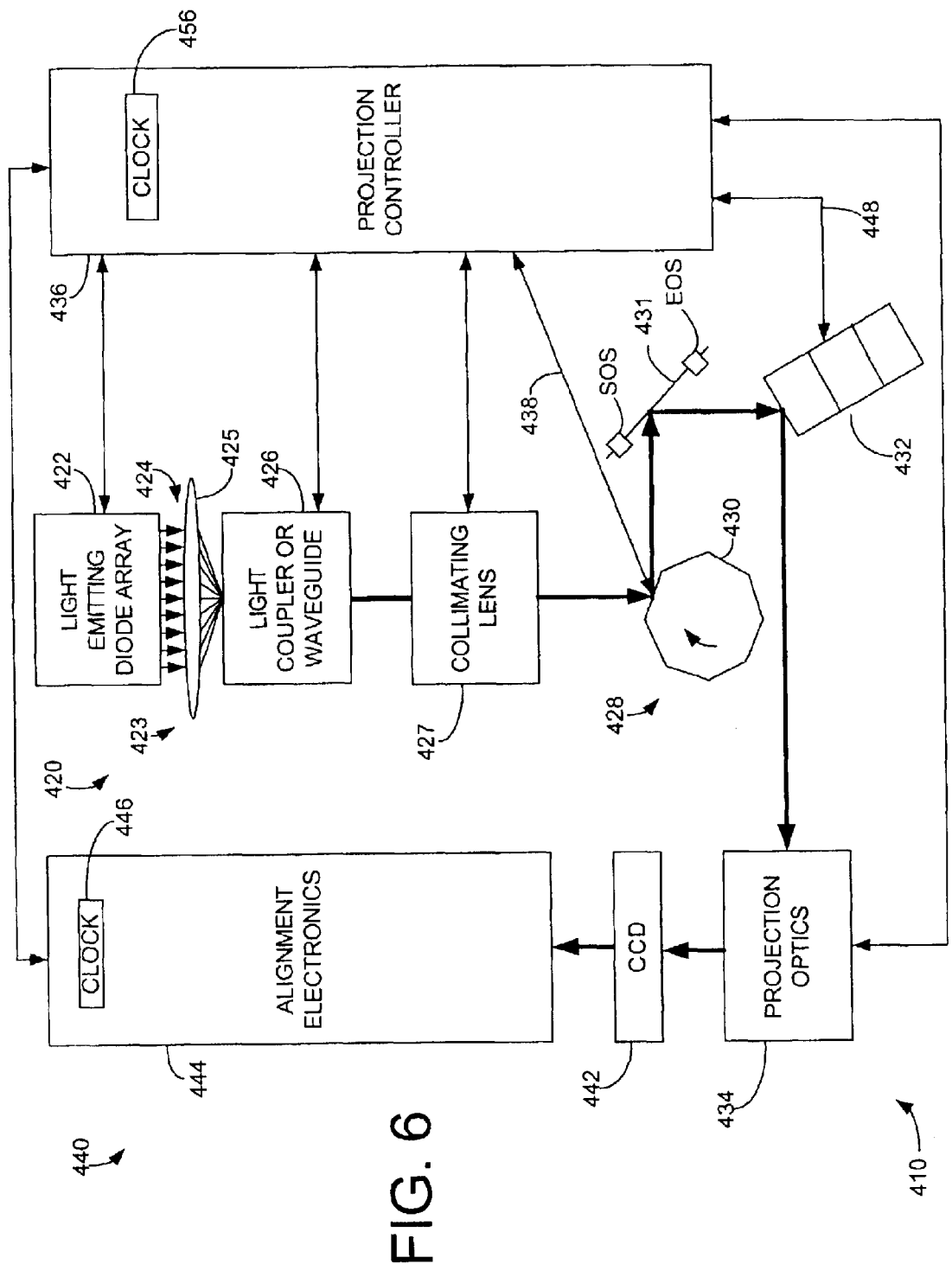
FIG. 6 is a schematic representation of another projector according to an embodiment of the invention.

Referring now to FIG. 6, another embodiment is illustrated as a projector 410. The projector 410 generally may include projection optics 434 that direct a collimated light beam onto the viewing screen in response to the manipulation of scanning optics 428 on the light beam. Both the projection optics 434 and the scanning optics 428 may be controlled by control electronics in the form of an image or projection controller 436. The projector 410 may further include a light engine or light signal generator 420 and beam optics 423. The beam optics 423 may include a converging lens 425 and a collimating lens 427 that are coupled together by an integrating tube or rod, light coupler, or waveguide 426. The light signal generator 420 and the beam optics 423 may be controlled by the projection controller 436.

The light signal generator 420 may be substantially similar to the light signal generator 320 and will not be described hereinafter in greater detail. Near collimated light beams 424 may be produced by a plurality of light sources, such as those of light-emitting diode array 422, and directed to beam forming optics 423 to produce a reduced light beam. The reduced light beam may be focused on scanning optics 428 by the combination of a converging lens 425, a light coupler 426 and a collimating lens 427. These beam forming optics 423, under control of the projection controller 436, may cause the plurality of beams 424 generated by the plurality of light-emitting sources 422 to be reduced in size and collimated, as was described with respect to projector 310.

The scanning optics 428 may be under the control of the projector controller 436, and may include a horizontal scanner 430 and a vertical scanner 432. The horizontal scanner 430 may be an x-axis polygon or multifaceted mirror that is mounted for controlled rotational movement under the control of the projection controller 436. The vertical scanner 432 may be a y-axis polygon or multifaceted mirror 432 that is also mounted for controlled rotational movement under the control of the projection controller 436.

The x-axis polygon mirror 430 may be mounted orthogonal to the y-axis polygon mirror 432. In order to transfer the super pixel focused on the x-axis polygon mirror 430 to the y-axis spinning polygon mirror 432, the scanning optics 428 may also include a mirror 431. Mirror 431 helps package the optical engine and it also provides an increase in the horizontal scan rate because of the doubling of the angle of deviation by the mirror 431. This eases the rotational velocity requirement of the horizontal scan system, and the inertia to be moved, and the opto-mechanical requirement to have a stiffer mirror structure to hold flatness at higher rotational inertias. By having two orthogonal axes, the reduced light beam scans a viewing surface, as represented by the scan pattern illustrated in FIG. 2. In this regard, if a single light source is activated and all the remaining light sources are deactivated, a single line trace indicated in the form of dashed line 13 traces out a slanted line across the rectangle as it scans.

In order to control the rotational speed of the horizontal scanner 430 and the vertical scanner 432, each of the scanner 430 and 432 may include encoder devices that generate rotational speed signals. The speed signals may be coupled to the projection controller 436 via two-way control lines that include a horizontal scan control line 438 and a vertical scan control line 448. Projection controller 436 may read the encoder signals generated by the individual ones of the polygon mirrors 430 and 432 to determine their rotational speed and then provide feedback signals that cause the rotational speed to be maintained, increased or decreased to achieve a desired scanning pattern. In order to properly address individual pixel locations on a viewing screen, the projection controller 436 may also control the time on and time off values for each of the light-emitting diodes in the light-emitting diode array 422 relative to the rotational speed of the horizontal scanner 430 and the vertical scanner 432. Start-of scan (SOS) and end-of-scan (EOS) detectors may also be used, as discussed above.

Various factors affect the relative locations of the pixels and, in particular, the relative alignment of the light spots generated by the individual light sources. To take care of deviations from a desired location, alignment may be performed by adjusting the timing of a given light source using an alignment system indicated generally at 440. The alignment system 440 may include a charge-coupled device 442 that is coupled to alignment electronics 444. In order to synchronize the projector 410 with the alignment system 440, the alignment electronics 444 may include a clock 446 that is coupled to the projection controller 436 and its associated clock 456. In this regard, the two clocks 446 and 456 are synchronized using a standard synchronization procedure. The projector clock 456 is the master clock and the alignment system clock 446 is a slave clock.

In order to correct for the various positional errors, projection controller 436 may include firmware that provides an indication of when a light beam generated by any individual one of the plurality of light sources should arrive at any one of the addressable pixel locations on the viewing surface. However, since the viewing surface may be incapable of generating a signal when the light beam illuminates the viewing surface, the charge-coupled device 442 may be positioned to detect the light beam. In this regard, when the charge-coupled device 442 detects a spot of light provided by the projection optics 434, the charge-coupled device 442 may generate a beam detection signal. The beam detection signal may be coupled to the alignment electronics 444, which in turn, may store the detection signal in the form of a detection code that includes a header code indicative of a pixel address location that would have otherwise been displayed on the viewing surface and a time code indicative of the time the detection signal was sensed and stored by the alignment electronics 444. The pixel address location may be in the form of x and y coordinate values that correspond to pixel locations on the viewing area of the viewing surface.

In response to the alignment electronics 444 storing the detection code, the projection controller 436 may retrieve the detection code and compare it with a pre-stored alignment code that is indicative of when the beam of light generated by the projector 410 should have illuminated the addressable pixel location on the viewing surface. In this regard, the projection controller firmware may first check the x-coordinate values and then the y-coordinate values for alignment. In the first instance if there is a comparison between the x-coordinate values and time values between the two codes, the projection controller firmware may proceed to check the y-coordinate values for alignment. However if there is not a proper comparison between the x-coordinate values and time values, the projection controller 436 may determine the differences between the two codes and make an adjustment to the x-scanner 430 by altering the timing of turning on individual light sources or LEDS.

The projection controller 436 then may retrieve a new detection code (for the same predetermined screen location) and repeat the x-coordinate alignment procedure as previously discussed. This is an iterative process until the two codes correspond relative to the x-coordinate values and the time values.

When there is an exact correspondence, the firmware in the projection controller 436 may proceed to make a comparison between the y-coordinate values and time values between the two codes. If the projection controller firmware determines that there is correspondence, the projection controller may generate another light beam for another predetermined addressable pixel location on the viewing surface and then repeat the above described alignment procedure. However if there is not a proper correspondence between the y-coordinate values and time values, the projection controller 436 may determine the differences between the two codes and make an adjustment to the y-scanner 432 by altering the timing that individually addressable light sources or LEDS are turned on.

The projection controller 436 may generate another light beam for the same predetermined addressable pixel location on the viewing surface. The projection controller 436 then may retrieve a new detection code (for the same predetermined location on the viewing surface) and repeat the y-coordinate alignment procedure as previously discussed. This may be an iterative process until the two codes correspond relative to the y-coordinate values and the time values.

Once there is a complete correspondence between the two codes, the projection controller 436 may generate another light beam from an additional individually addressable light source or LED. The above-described procedure then may be repeated until relative alignment has been achieved between all of the individually addressable spots that make up the superpixel.

It should be understood by those skilled in the art that a light beam for each of the colors red, blue, and green may be projected onto each addressable pixel location. A white light that may be formed by the projection of all three-color beams simultaneously.

While the present disclosure has been provided with reference to the foregoing embodiments, those skilled in the art will understand that many variations may be made therein without departing from the spirit and scope defined in the following claims. For example, many configurations of light sources may be used. Each light source may be a combination of light from individual light elements. Additionally, any light source that generates a plurality of individual lights may be used. As an example, one could use a spatial light modulator to produce light corresponding to a portion of an image area, and then scan the output of the spatial light modulator across the viewing surface, as has been described for other types of light sources. Reflectors may also be used to collimate or reduce the size of the light beam. Therefore, the foregoing embodiments are illustrative, and no single feature, procedure or element is essential to all possible combinations that may be claimed in this or a later application. Moreover, the description should be understood to include all novel and non-obvious combinations of elements described herein, and claims may be presented in this or a later application to any novel and non-obvious combination of these elements. Where the claims recite "a" or "another" element or the equivalent thereof, such claims should be understood to include incorporation of one or more such elements, neither requiring nor excluding two or more such elements.

What is claimed:

1. A concentrated beam source for a projector comprising:
   a plurality of individually addressable light sources configured in a two-dimensional array; and
   a beam concentrator configured to receive light from the plurality of light sources and to produce a reduced beam of collimated light having a component representative of each light source and having cross-sectional dimensions smaller than cross-sectional dimensions of the two-dimensional array.

2. The beam source of claim 1, which further comprises scanning optics configured to deflect the reduced beam in a two-dimensional scan pattern.

3. The beam source of claim 2, wherein the scanning optics are further configured to produce successive overlapping two-dimensional scan patterns.

4. The beam source of claim 1, wherein the plurality of light sources produces a collimated beam of light having a component representative of each light source.

5. The beam source of claim 1, wherein the plurality of light sources includes at least one of a light-emitting semiconductor device and a laser.

6. The beam source of claim 5, wherein the plurality of light sources includes at least one of a light-emitting diode and a vertical cavity surface emitting laser.

7. The beam source of claim 1, wherein the beam concentrator includes an afocal beam expander having one or more refractive, reflective, or diffractive optical elements.

8. The beam source of claim 1, wherein the beam concentrator includes a Galilean beam expander having a lens or a group of lenses having positive power and a lens or a group of lenses having negative power.

9. The beam source of claim 1, wherein the beam concentrator includes a Keplerian beam expander having a plurality of lenses or groups of lenses having positive power.

10. The beam source of claim 1, wherein the beam concentrator produces a reduced beam having cross-sectional dimensions less than one fourth the cross-sectional dimensions of the two dimensional array.

11. The beam source of claim 1, wherein the beam concentrator produces a reduced beam having cross-sectional dimensions less than one tenth the cross-sectional dimensions of the two-dimensional array.

12. A concentrated beam source for a projector comprising:

a plurality of individually addressable light sources, including at least one of a light-emitting semiconductor device and a laser, configured in a two-dimensional array to produce a collimated source beam of light having a component representative of each light source;

a converging lens configured to receive the source beam and focus the beam toward a focal point; and a diverging lens configured to convert the focused beam into a reduced beam of collimated light having a component representative of each light source and having cross-sectional dimensions smaller than cross-sectional dimensions of the collimated source beam.

13. The beam source of claim 12, which further comprises scanning optics configured to deflect the reduced beam in a two-dimensional scan pattern.

14. The beam source of claim 13, wherein the scanning optics are further configured to produce successive overlapping two-dimensional scan patterns.

15. A projector comprising:
a plurality of individually addressable light sources configured in a two-dimensional array;
a beam concentrator configured to receive light from the plurality of light sources and to produce a reduced beam of collimated light having a component representative of each light source and having a cross-sectional area smaller than a cross-sectional area of the two-dimensional array; and
display optics configured to receive the reduced beam and project toward a viewing surface a projected beam representative of the reduced beam.

16. The projector of claim 15, wherein the plurality of light sources produces a collimated source beam of light having a component representative of each light source.

17. The projector of claim 15, wherein the plurality of light sources includes at least one of a light-emitting semiconductor device and a laser.

18. The projector of claim 17, wherein the plurality of light sources includes at least one of a light-emitting diode and a vertical cavity surface emitting laser.

19. The projector of claim 15, wherein the beam concentrator includes a converging lens and a diverging lens.

20. The projector of claim 15, wherein the beam concentrator includes an afocal beam expander having one or more refractive, reflective, or diffractive optical elements.

21. The projector of claim 15, wherein the beam concentrator includes a Galilean beam expander having a lens or a group of lenses having positive power and a lens or a group of lenses having negative power.

22. The projector of claim 15, wherein the beam concentrator includes a Keplerian beam expander having a plurality of lenses or groups of lenses having positive power.

23. The projector of claim 15, wherein the display optics includes scanning optics and projection optics, the scanning optics being configured to deflect the reduced beam in a manner causing, when projected by the projection optics, an image of the light source array to scan across a viewing surface.

24. The projector of claim 23, wherein the scanning optics are configured to deflect the reduced beam in a two-dimensional scan pattern.

25. The projector of claim 23, wherein the scanning optics are configured to deflect the reduced beam in successive, overlapping two-dimensional scan patterns.

26. The projector of claim 15, wherein the beam concentrator produces a reduced beam the cross-sectional area of the reduced beam being less than one fourth the cross-sectional area of the two-dimensional array.

27. The projector of claim 15, wherein the beam concentrator produces a reduced beam the cross-sectional area of the reduced beam being less than one tenth the cross-sectional area of the two-dimensional array.

28. A projector comprising:
a plurality of individually addressable light sources, including at least one of a light-emitting semiconductor device and a laser, configured in a two-dimensional array to produce a collimated source beam of light having a component representative of each light source;
a converging optical device configured to receive the source beam and focus the beam toward a focal point;
a diverging optical device configured to convert the focused beam into a reduced beam of collimated light having a component representative of each light source and having dimensions smaller than dimensions of the collimated source beam;
scanning optics configured to deflect the reduced beam in a two-dimensional pattern; and
projection optics configured to project the scanning beam toward a viewing surface.

29. The projector of claim 28, wherein diverging optical device includes an afocal beam expander having one or more refractive, reflective, or diffractive optical elements.

30. The projector of claim 28, wherein the beam concentrator includes a Galilean beam expander having a lens or a group of lenses having positive power and a lens or a group of lenses having negative power.

31. The projector of claim 28, wherein the beam concentrator includes a Keplerian beam expander having a plurality of lenses or groups of lenses having positive power.

32. A method of producing a concentrated beam for a projector comprising:
producing light from a plurality of individually addressable light sources configured in a two-dimensional array;
forming a reduced beam of light from the light produced by the plurality of light sources, the reduced beam having a plurality of components, with each component representative of at least one active light source, the reduced beam of light having a cross-sectional area smaller than a cross-sectional area of the two-dimensional array; and
collimating the reduced beam of light.

33. The method of claim 32, which further comprises scanning the collimated reduced beam in a two-dimensional scan pattern.

34. The method of claim 32, which further comprises scanning the collimated reduced beam in successive two-dimensional scan patterns.

35. The method of claim 32, wherein producing light includes producing a collimated beam of light having a component representative of at least one active light source.

36. The method of claim 32, wherein forming a reduced beam of light includes converging the light produced by the plurality of light sources.

37. The method of claim 32, wherein forming a reduced beam includes forming a reduced beam of cross-sectional area less than one fourth the cross-sectional area of the two-dimensional array.

38. The method of claim 32, wherein forming a reduced beam includes forming a reduced beam of cross-sectional area less than one tenth the cross-sectional area of the two-dimensional array.

39. A concentrated beam source for a projector comprising:

means for producing a two-dimensional array of individual light beams; and means for receiving the individual light beams and for producing a reduced two-dimensional array collimated light beams, the reduced two-dimensional array having a component representative of each individual light beam and having cross-sectional dimensions smaller than cross-sectional dimensions of the two-dimensional array of individual light beams.

40. The beam source of claim 39, which further comprises means for deflecting the reduced two-dimensional array of individual light beams in a two-dimensional scan pattern to produce an image.

41. The beam source of claim 39, which further comprises means for the reduced two-dimensional array of individual light beams in successive, overlapping two-dimensional scan patterns to produce an image.

42. The beam source of claim 39, wherein the means for producing the two-dimensional array of individual light beams is further for producing collimated light having components representative of each of a plurality of individually addressable light sources.

43. The beam source of claim 42, wherein the plurality of individually addressable light sources includes at least one of a light-emitting semiconductor device and a laser.

44. The beam source of claim 43, wherein the plurality of individually addressable light sources includes at least one of a light-emitting diode and a vertical cavity surface emitting laser.

45. The beam source of claim 39, wherein the means for producing a reduced two-dimensional array of collimated light beams includes means for converging the individual light beams received and means for diverging converging individual light beams received from the means for converging the individual light beams.

46. A method of making a concentrated beam source for a projector comprising:

providing a plurality of individually addressable light sources configured in a two-dimensional array; and providing a beam concentrator configured to receive light from the plurality of light sources and to produce a reduced beam of collimated light having a component representative of each light source and having cross-sectional dimensions smaller than cross-sectional dimensions of the two-dimensional array.

47. The method of claim 46, which further comprises providing scanning optics configured to deflect the reduced beam in a two-dimensional scan pattern.

48. The method of claim 46, wherein the scanning optics are further configured to deflect the reduced beam in successive overlapping two-dimensional scan patterns.

49. The method of claim 46, wherein providing a plurality of light sources includes providing a plurality of light sources that collectively produce collimated light having components representative of each active light source.

50. The method of claim 46, wherein providing a beam concentrator includes providing a converging lens and a diverging lens.

51. The method of claim 46, wherein providing a beam concentrator includes providing a diverging optical device including an afocal beam expander having one or more refractive, reflective, or diffractive optical elements.

52. The method of claim 46, wherein providing a beam concentrator includes providing a Galilean beam expander having a lens or a group of lenses having positive power and a lens or a group of lenses having negative power.

53. The method of claim 46, wherein providing a beam concentrator includes providing a Keplerian beam expander having a plurality of lenses or groups of lenses having positive power.

54. An electronic device comprising:

a plurality of individually addressable light sources configured in a two-dimensional array;

a beam concentrator configured to receive light from the plurality of light sources and to produce a reduced array of collimated light having a component representative of each active light source and having cross-sectional dimensions smaller than cross-sectional dimensions of the two-dimensional array; and display optics configured to receive the reduced array and project toward a viewing surface a representation of the reduced array.

55. The electronic device of claim 54, wherein the plurality of light sources produces collimated light having components representative of each active light source.

56. The electronic device of claim 54, wherein the beam concentrator includes a converging lens and a diverging lens.

57. The electronic device of claim 54, wherein the display optics includes scanning optics and projection optics, the scanning optics being configured to deflect the reduced array in a manner causing, when projected by the projection optics, an image of the light source array to scan across a viewing surface.

58. The electronic device of claim 54, wherein the scanning optics are configured to deflect the reduced array in a two-dimensional scan pattern.

59. The electronic device of claim 54, wherein the scanning optics are configured to deflect the reduced array in successive, overlapping two-dimensional scan patterns.

60. The electronic device of claim 54, further comprising a controller configured to control operation of the plurality of light sources based on an image signal.

61. A spatial light modulator comprising:

a light signal generator including plural individually addressable light sources configured in a two-dimensional array;

concentrated beam optics including a beam concentrator configured to receive light from the plurality of light sources and to produce a reduced beam of collimated light having a component representative of each light source and having cross-sectional dimensions smaller than cross-sectional dimensions of the two-dimensional array; and display optics including scanning optics configured to deflect the reduced beam in a two-dimensional scan pattern.

62. The spatial light modulator of claim 61, wherein the scanning optics are further configured to produce successive, overlapping two-dimensional scan patterns.

* * * * *